May 9, 1933. G. E. FORD 1,908,626
AUTOMATIC CONTROL DEVICE
Filed April 4, 1930 2 Sheets-Sheet 1

INVENTOR
George E. Ford
BY
his ATTORNEY

May 9, 1933.　　　　　G. E. FORD　　　　　1,908,626
AUTOMATIC CONTROL DEVICE
Filed April 4, 1930　　　2 Sheets-Sheet 2
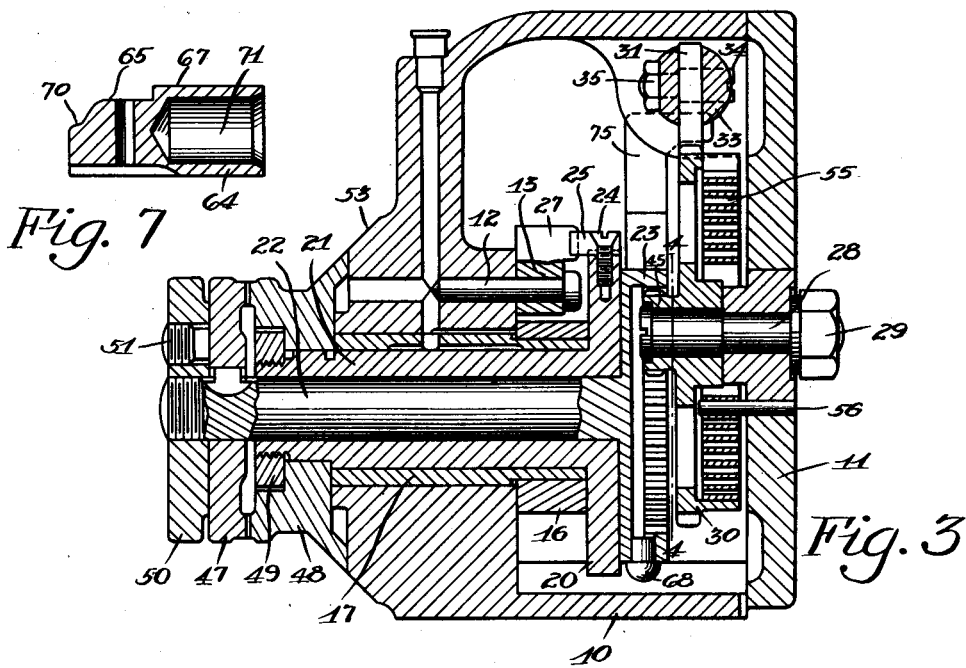
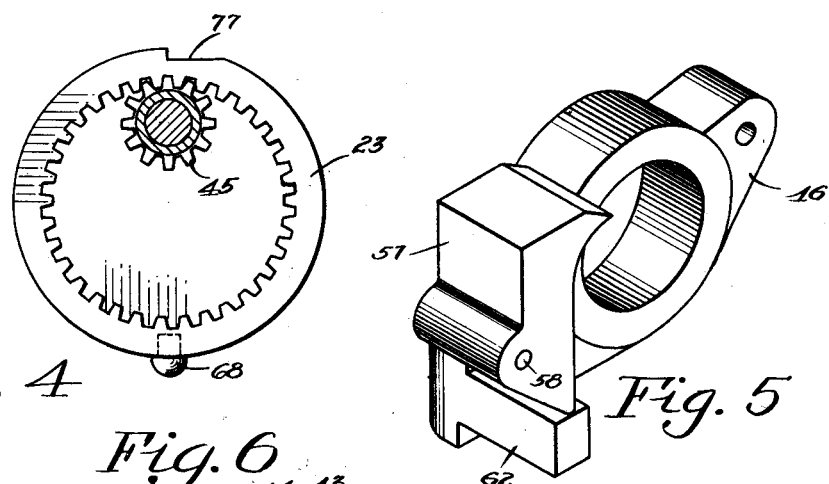
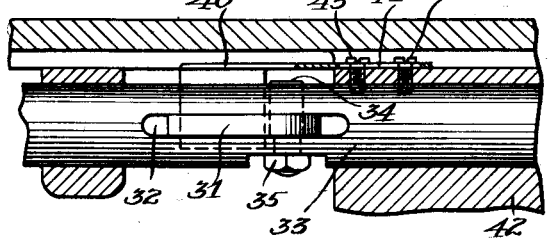
INVENTOR
George E. Ford
BY
his ATTORNEY Patented May 9, 1933

1,908,626

UNITED STATES PATENT OFFICE

GEORGE E. FORD, OF ROCHESTER, NEW YORK, ASSIGNOR TO GLEASON WORKS, OF ROCHESTER, NEW YORK, A CORPORATION OF NEW YORK

AUTOMATIC CONTROL DEVICE

Application filed April 4, 1930. Serial No. 441,694.

The present invention relates to automatic control devices, devices such as are used, for instance, to stop a machine after it has completed a predetermined number of operations. These control devices are employed, for instance, in gear cutting machines to stop the machine after the required number of teeth have been cut in the blank and in wire-winding machines to stop the machine after the required number of turns have been wound upon the spool and so forth.

The primary object of this invention is to provide a mechanism of the character described which will be compact, cheap to construct, simple in operation, and easy to keep in order.

A further object of this invention is to provide a mechanism of the character described in which a ratchet wheel may be used as the step-by-step advancing element and in which the mechanism itself can be set for a number of operations independent of the number of teeth in the ratchet wheel. It is thereby possible to provide a ratchet wheel which will have teeth of the requisite strength while obtaining any desired number of operations of the machine.

Further objects of the invention will be apparent hereinafter from the specification when taken in conjunction with the accompanying drawings and from the recital of the appended claims.

In the drawings:

Figure 3 is a section through the control device, such as might be taken on the line 3—3 of Figure 1;

Figure 4 is a section on the line 4—4 of Figure 3, showing the reduction gearing connecting the ratchet wheel with the actuating disc;

Figure 5 is a perspective view of the detent and the detent trip lever;

Figure 6 is a fragmentary sectional view taken on the line 6—6 of Figure 1; and

Figure 7 is a sectional view of the detent lock-dog.

Figure 1:
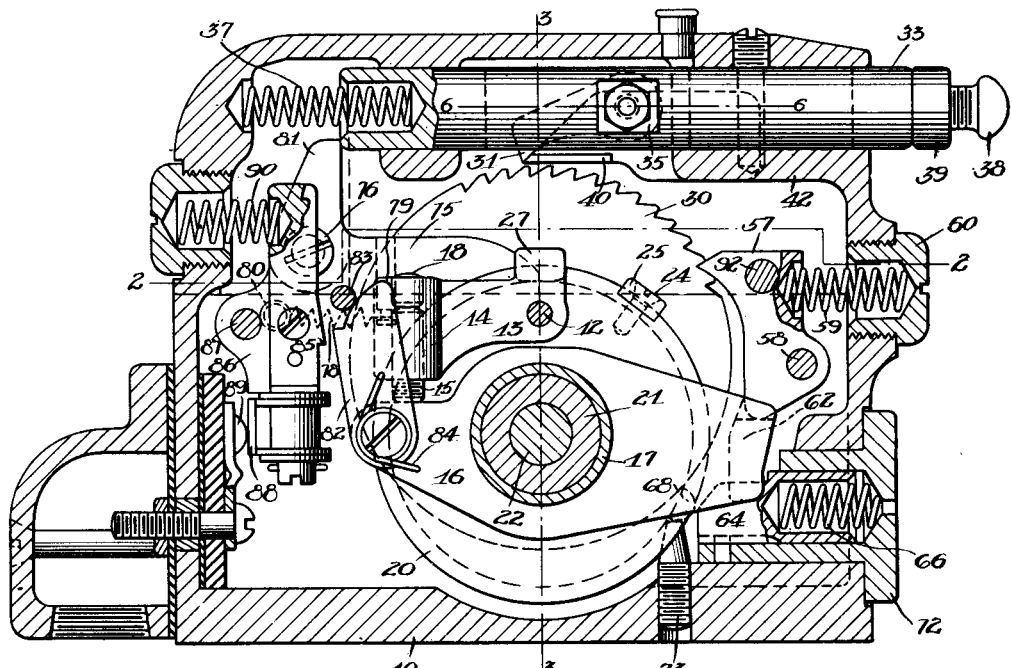
Figure 1 is a vertical sectional view of a control device constructed according to a preferred embodiment of my invention.
Figure 2:
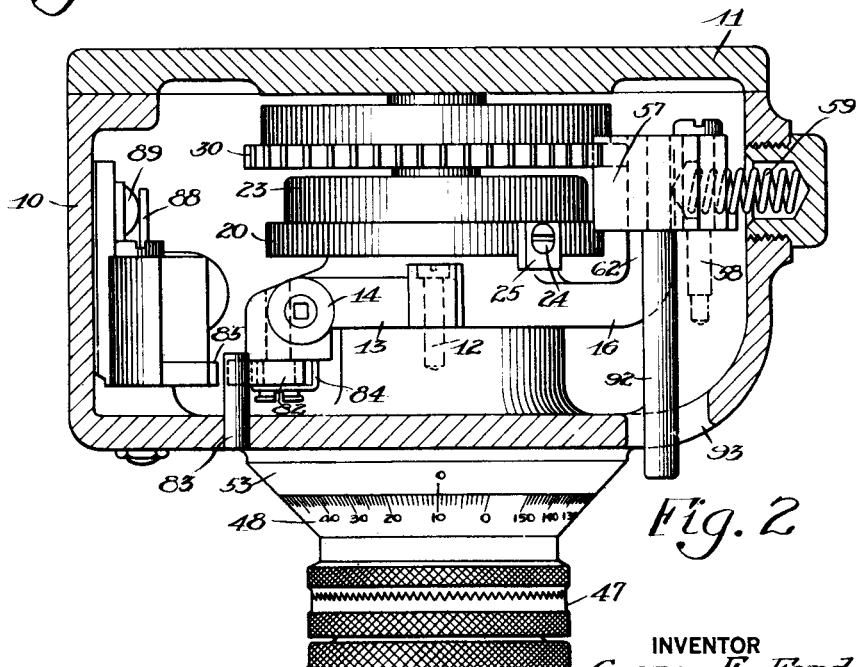
Figure 2 is a section taken on the line 2—2 of Figure 1.

Referring to the drawings by numerals of reference, 10 indicates the casing in which the mechanism of this invention is housed. The end wall of this casing is closed by a cover-plate 11 which may be secured to the casing by screws (not shown) or in any other suitable manner. Pivotally mounted in the casing on the pin 12 is a trip-dog 13.

Threaded into a boss 14 formed on one arm of the trip-dog 13 is a screw 15 which is adapted to engage one arm of a rockable trip-lever 16. The trip-lever 16 is loosely mounted on the bushing 17 mounted in the casing 10. When the trip-dog 13 is rocked downwardly about its pivot pin 12, the screw 15 engages the trip-lever 16 and rocks this trip-lever 16 on the bushing 17.

20 designates a disc which is provided with a projecting sleeve or hub 21. The sleeve portion 21 of the disc 20 is journaled within the bushing 17 and on the stud or shaft 22 of an internal gear 23.

Secured to the periphery of the disc 20, as by means of a screw 24, is a lug 25.

The disc 20 is adjusted initially so that the lug 25 is removed from the trip-dog 13 an angular distance determined by the number of operations desired to be performed on the machine on which the control device is used. The disc 20 is advanced step-by-step, by means now to be described, with each minor operation of the machine until the lug 25 engages the short arm 27 of the trip-dog 13 to rock this dog about its pivot pin 12.

By adjusting the screw 15 above referred to, the trip-dog 13 can be adjusted about its pivot 12 to insure the lug 25 contacting with the arm 27 at the proper point so that as the disc 20 is advanced for the last time in its step-by-step movement, this last movement of the disc is imparted in its entirety through the lug 25 to the trip-dog 13.

Journaled on the stud 28 which is secured by means of a nut 29 to the cover-plate 11 is a ratchet wheel 30. The ratchet wheel 30 is adapted to be advanced step-by-step by means of a pawl 31 which is secured in the slot 32 of the rod 33 for pivotal movement by means of the pin 34 and nut 35.

The plunger 33 is slidably mounted in suitable bearings formed in the casing 10. A coil-spring 37 interposed between the inner end of the plunger 33 and the inside wall of the casing 10 serves to urge the plunger outwardly. A contact-head 38 is adjustably threaded into the outer end of the plunger and secured in its adjusted position by means of the lock-nut 39. With each minor operation of the machine on which the control device is mounted, some device on the machine, such as a cam, engages the head 38 and pushes the plunger 33 inwardly against the resistance of the spring 37, causing the pawl 31 to engage the ratchet wheel 30 and advance the ratchet wheel a slight angular distance on its stud 28. When the actuating part of the cam or other device has passed by the head of the plunger, the spring 37 returns the plunger to outer position ready to be engaged again and shoved inwardly again the next time the cam or other device engages the head 38.

A deflector or guard 40 is provided to govern the amount of angular movement of the ratchet wheel with each reciprocation of the plunger 33. This deflector 40 is L-shaped. One arm of it is adjustably secured to the bearing 42, in which the plunger 33 slides, by means of the screws 43 which pass through the slot 44 formed in this arm of the deflector and thread into the bearing 42. Depending upon the position in which the deflector is adjusted, the pawl 31 will advance the ratchet wheel 30 a tooth at a time or several teeth at a time.

Formed integral with the ratchet wheel 30 is a spur pinion 45. This pinion meshes with the internal gear 23 so that as the ratchet wheel 30 is advanced by the pawl 31, the internal gear 23 receives a step-by-step movement also, the amount of this movement for any one stroke of the pawl, depending upon the ratio of the pinion 45 to the gear 23.

The internal gear 23 is adapted to be connected to the disc 20 to impart a step-by-step motion to the disc 20 and the lug 25 secured thereto. This connection is made by means of the clutch member 47 which is keyed to the shaft 22 of the internal gear 23 and which is adapted to engage with the clutch teeth formed on the end face of a setting dial 48. The dial 48 is keyed to the hub 21 of the disc 20 and is held thereon by the nut 49 which engages the dial and threads onto the hub 21. When the teeth of the clutch member 47 and of the dial 48 are engaged, the disc 20 and the internal gear 23 will rotate together. A lock-nut 50 is provided to hold the clutch teeth in engagement. This lock-nut 50 threads onto the end of the shaft 22. The set-screw 51 is provided to hold the lock-nut 50 against rotation when threaded into locking position. The inner face of this set-screw engages the outer face of the clutch member 47.

The dial 48 is graduated to permit setting the control device for the desired number of operations of the machine. To set the device, the set-screw 51 is released and the lock-nut 50 is unthreaded far enough to permit disengaging the teeth of the clutch member 47 from the teeth of the dial 48. The dial 48 is then rotated by hand until the graduation on the dial corresponding to the number of operations desired registers against a zero-mark inscribed on the boss 53 formed on the casing 10. In setting the dial 48, the disc 20 is rotated to carry the lug 25 away from the trip dog 13.

After the dial has been adjusted, the disc 20 is reconnected to the internal gear 23. Movement of the plunger 33 now carries the pawl 31 into engagement with the ratchet wheel 30 and imparts a step-by-step movement to the ratchet wheel with each reciprocation of the plunger. This movement is imparted, in turn, through the gearing 45—23, the shaft 22, the clutch member 47 and the dial member 48 to the disc 20. When the machine has performed its last operation, the disc 20 will have advanced far enough so that the lug 25 will be brought into engagement with the trip-dog 13 to rock this dog about its pivot pin 12 to rock the lever 16 on is axis. The lever 16 may be connected by a chain or in any other suitable manner, as will readily be understood by those skilled in the art, to a belt-shifter or to an electric switch so as when rocked to shift the belt to an idle pulley or break the electric circuit to the machine, stopping the machine.

It is desirable that the control device reset itself automatically after it has tripped. To this end, there is a coil-spring 55 secured at one end to the ratchet wheel 30 and at its opposite end, by means of a pin 56 to the cover-plate 11. This spring constantly urges the ratchet wheel to return to initial position. A detent 57 is provided to hold the ratchet wheel in any position to which it is advanced by the pawl 31. This detent 57 is pivoted on the pin 58 which is secured in the casing and is constantly urged into engagement with the teeth of the ratchet wheel to hold the same against retrograde movement by a coil-spring 59. The detent is recessed to receive one end of the coil-spring 59 and the other end of the spring fits into a recess formed in a cap-member 60 that threads into an opening in one side of the casing 10.

The rocking-arm 16 is formed at the end opposite that engaged by the screw 15 with an integral lug or projection 62. When the trip-lever 16 is rocked by the trip-lever 13, the projection 62 of the lever engages the tail of the detent 57 and rocks the detent out of engagement with the ratchet wheel to permit the ratchet wheel to return to initial position under actuation of the coil-spring 55.

64 designates a lock-dog. The lug 62 of the lever 16 normally rests on the ledge 65 of this dog but when the lever 16 is rocked to disengage the detent 57 the lever 16 clears the ledge 65 and the dog 64 is forced inwardly by the coil-spring 66. This coil-spring 66 is contained between the recess 71 formed in the lock-dog 64 and a recess formed in the opposed face of a cap member 72 which is secured in an opening in the side wall of the casing 10. The ledge 67 of the lock-dog will now engage under the lug 62 of the lever 16. Thus, the detent 57 will be locked in disengaged position. It will be so held until the ratchet wheel has completed its return to initial position, resetting the control device. Then the pin 68 on the internal gear 23 engages the nose 70 of the lock-dog 64, forcing this dog outwardly against the resistance of the spring 66 to release the trip-lever 16 and permit the spring 59 to return the detent 57 into engagement with the ratchet wheel and return the lever 16 to normal position.

The set-screw 73 which is threaded into the base of the casing 10 determines the zero position of the disc. It engages the pin 68 and stops the resetting movement of the internal gear.

To prevent rebound of the parts when the pin 68 engages the set screw 73, a rebound-latch 75 is provided. This latch 75 is pivoted on a pin 76 secured on the cover 11. It is L-shaped and one arm of it which is adapted to engage the notch 77 cut into the periphery of the internal gear 23 is continuously urged to locking position by the spring 78. This spring is connected at one end to a pin 79 that is fastened to the catch and at its other to a pin 80 that is fastened on the cover 11. When the rebound catch is in locking position, its upper arm 81 is in position to be engaged by the end of the plunger 33. Thus, as the plunger moves inwardly on the first operation of the machine in its work on a new piece, the plunger engages the catch and rocks it out of the way to permit the pawl 31 acting through the ratchet wheel 30 to advance the internal gear.

The mechanism illustrated in the accompanying drawings is particularly designed as an electrical trip device. Thus, the rocking arm 16 carries a catch member 82 pivotally mounted thereon. Normally, this catch member 82 is held by a pin 83 which is secured in the casing 10. When the lug 25 reaches tripping position and trips the dog 13 to rock the arm downwardly, the catch member 82 rides on the pin 83 and, under actuation of the coil spring 84, engages a ledge 85 formed on the switch-arm 86. When the arm 16 is rocked in the opposite direction by the return of the detent 57 into engagement with the ratchet wheel 30, the catch 82 rocks the switch arm about its pivot 87, breaking the circuit made between the bar 88 of the switch arm and the terminals 89, stopping the machine. The pin 83, reengaging the catch, however, immediately thereafter, causes the catch to release the switch arm and the bar 88 is returned into contact with the terminals 89 under actuation of the spring 90. This remakes the circuit so that the machine can be restarted by pressing the starter button.

The operation of the control device may be briefly summed up now. It is first adjusted for the number of operations desired in the machine by disengaging the teeth of the clutch member 47 from the teeth of the dial member 48 and by rotating the dial and with it the disc 20 to the required position. The disc 20 is then reconnected to the ratchet wheel 30 by reengaging the teeth of the clutch member 47 and of the dial member 48. With each operation of the machine, the plunger 33 is reciprocated to cause the pawl 31 to advance the ratchet wheel 30 one or more teeth, as determined by the position of the deflector 40. The movement of the ratchet wheel is transmitted at a reduced rate through the pinion 45 and internal gear 23 to the disc 20. Thus, the ratchet wheel may make several revolutions for one revolution of the disc, as determined by the ratio of the gearing 45—23. On the final operation of the machine, the lug 25 will have been advanced far enough so that it engages the trip-dog 13, rocking this dog about its pivot 12 and causing it in turn to rock the arm 16 about its axis. As the arm 16 is rocked, the catch member 82 rides on the pin 83 and engages the ledge 85 of the switch-arm 86. At the same time, the lug 62 on the arm 16 engages the tail of the detent 57 rocking this detent out of engagement with the ratchet wheel 30. In its movement, the rocker arm 16 clears the ledge 65 of the locking dog 64 and this dog is forced by the spring 66 further inward into the casing so that the lug 62 of the rocker arm will rest upon the ledge 67 of the dog 64. Thus, the detent 57 is held in disengaged position. It is so held until the internal gear 23 has returned to initial position through the action of the coil-spring 55 through the gearing 45—23. As the internal gear returns to initial position, which position is determined by engagement of the pin 68 with the set-screw 73, the pin 68 pushes the locking-dog 64 out of the way, the detent 57 is forced back into engagement with the ratchet wheel 30 and at the same time the rocking arm 16 is forced downwardly by the action of the spring 59 on the detent, causing the catch member 82 to rock the switch arm 86 about its pivot and break the circuit to the machine. The rebound latch 75 which has become engaged with the notch 77 in the periphery of the internal gear will be disengaged by the plunger 33 in the first operation of the plunger thereafter and will ride on the periphery of the disc during the ensuing operations until the device is tripped again.

The control device can be reset at any time by disengaging the detent 57 from the ratchet wheel. To this end a pin 92 is connected to the detent. This pin 92 extends through an opening 93 in the casing and through it the operator can rock the detent out of engagement with the ratchet wheel.

Due to the use of reduction gearing between the ratchet wheel and the actuating disc 20, it is possible to set the control device for a large number of operations while using a ratchet wheel which will have a smaller number of teeth than there are graduations. Thus, the teeth of the ratchet wheel can be made as strong as desired without the reduction in their number in anywise affecting the range of the control device. It is preferred to trip the switch arm 86 on the rocking motion of the arm 16 under actuation of the detent 57 and spring 59 as this permits the machine to fully complete its operation before it is stopped. However, it will be obvious that the mechanism may be modified to operate in many different ways.

In general, it may be said that while I have described my invention in connection with a specific embodiment it will be understood that this invention is capable of various further modifications and that this application is intended to cover any adaptations, uses, or variations of my invention following, in general, the principles of the invention and including such departures of the present disclosure as come within known or customary practice in the art to which it pertains and as may be applied to the essential features hereinbefore set forth and as fall within the scope of the invention or the limits of the appended claims.

Having thus described my invention, what I claim is:

1. In an automatic control device, a trip member, a rotatable disc, means operable when the disc has reached a predetermined position to actuate said trip member, means for adjusting the disc initially a predetermined angular distance away from actuating position, a ratchet wheel, a pawl for advancing the ratchet wheel step-by-step, means adapted to connect the ratchet wheel to the disc, a spring connected to the disc constantly urging the same back to initial position, a detent operable to hold the disc against retrograde movement as it is advanced by the ratchet wheel, means operable when the trip member is actuated to disengage said detent, means for positively holding said detent disengaged during the return movement of the disc to initial position, and means carried by the disc for tripping the last named means out of operative position when the disc has returned to initial position to permit return of the detent to operative position.

2. In an automatic control device, a trip member, a rotatable disc, means operable when the disc has reached a predetermined position to actuate said trip member, means for adjusting the disc initially a predetermined angular distance away from actuating position, a ratchet wheel, a pawl for advancing the ratchet wheel step-by-step, means adapted to connect the ratchet wheel to the disc, a spring adapted to urge the disc constantly to return to initial position, a detent operable to hold the disc against retrograde movement as it is advanced by the ratchet wheel, an electric switch connected in the circuit of the machine on which the control device is used, a member adapted to be rocked by said trip member in one direction, when said trip member is actuated, to disengage said detent, means operable thereafter to lock said detent out of operative position until the disc has returned to initial position, means carried by the disc for disengaging the last named means when the disc has returned to initial position to permit return of the detent to operative position, said detent in its return to operative position rocking said rocking member in a direction opposite to its first named movement, and means carried by said rocking member adapted to engage the switch, when said member is rocked by the detent, to break the circuit of the machine.

3. In an automatic control device, a trip member, a rotatable disc, means operable when the disc has reached a predetermined position to actuate said trip member, means for adjusting the disc initially a predetermined angular distance away from actuating position, a ratchet wheel, a pawl for advancing the ratchet wheel step-by-step, means adapted to connect the ratchet wheel to the disc, a spring adapted to urge the disc constantly to return to initial position, a detent operable to hold the disc against retrograde movement as it is advanced by the ratchet wheel, means for disengaging said detent when the trip is actuated to permit the disc to return to initial position under actuation of the spring, a rebound latch adapted to hold the disc in initial position when it has returned thereto and means operable on the first movement thereafter of the pawl to trip the rebound latch out of holding position.

4. In an automatic control device, a trip member, a rotatable disc, means operable when the disc has reached a predetermined position to actuate said trip member, a dial connected to the disc for setting the disc initially a predetermined angular distance away from actuating position, a ratchet wheel, a pawl operable from a source external of said control device for advancing the ratchet wheel step-by-step, reduction gearing, one member of which is connected to the ratchet wheel, means adapted to connect another member of said reduction gearing to said disc to rotate said disc on advance of the ratchet wheel at a different rate from the rate of advance of said ratchet wheel, said last-named means being disconnectible from the disc for adjusting the disc initially.

5. In an automatic control device, a trip member, a rotatable disc, means operable when the disc has reached a predetermined position to actuate said trip member, a dial connected to the disc for setting the disc initially a predetermined angular distance away from actuating position, a ratchet wheel, a pawl for advancing the ratchet wheel step-by-step, a pinion connected to the ratchet wheel, an internal gear with which said pinion is adapted to mesh and a clutch for detachably connecting the internal gear to the disc whereby the disc may be set initially by disconnecting the disc from the internal gear and may be advanced step-by-step to actuating position when the disc and internal gear are again connected.

6. In an automatic control device, a trip member, a rotatable disc, means operable when the disc has reached a predetermined position to actuate said trip member, a dial connected to the disc for setting the disc initially a predetermined angular distance away from actuating position, a ratchet wheel, a pawl for advancing the ratchet wheel step-by-step, a pinion connected to the ratchet wheel, an internal gear, a clutch for detachably connecting the internal gear to the disc whereby the disc may be set initially by disconnecting the disc from the internal gear, and may be advanced step-by-step to actuating position when the disc and internal gear are again connected, a spring connected to the ratchet wheel constantly urging the ratchet wheel back to initial position, a detent adapted to hold the ratchet wheel against retrograde movement, and means whereby when said trip member is actuated, said detent is disengaged from the ratchet wheel.

7. In an automatic control device, a trip member, a rotatable disc, means carried by the disc operable when the disc has reached a predetermined position to actuate said trip member, a ratchet wheel, a pawl for imparting a step by step movement to the ratchet wheel, reduction gearing rotatable on actuation of said ratchet wheel, means operable to connect the reduction gearing with said disc, said last named means being releasable to permit adjustment of the actuating means carried by the disc a predetermined distance away from actuating position, a spring constantly urging the disc to return to initial position, a detent operable to hold the disc against retrograde movement as it is advanced by the ratchet wheel, means operable when the trip member is actuated to dis-engage said detent, means for positively holding the detent dis-engaged during the return movement of the disc to initial position, and means carried by the disc for tripping said last named means out of operative position when the disc has reached initial position to permit return of the detent to operative position.

8. In an automatic control device, a trip member, a rotatable disc, means carried by the disc operable when the disc has reached a predetermined position to actuate said trip member, a ratchet wheel, a pawl for imparting a step by step movement to the ratchet wheel, reduction gearing rotatable on actuation of said ratchet wheel, means operable to connect the reduction gearing with the disc, said last named means being releasable to permit adjustment of the actuating means carried by the disc a predetermined distance away from actuating position, a spring constantly urging the disc to return to initial position, a detent operative to hold the disc against retrograde movement as it is advanced by the ratchet wheel, an electrical switch connected in circuit with the machine on which the control device is mounted, means operable when the trip member is actuated to dis-engage said detent, and means operable when the disc has returned to initial position to engage said switch and break the circuit to the machine.

9. In an automatic control device, a pivoted trip member, a rotatable disc, actuating means carried by the disc operable when the disc has reached a predetermined position to rock the trip member about its pivot, a ratchet wheel, a pawl for imparting a step by step movement to the ratchet wheel, reduction gearing rotatable on actuation of the ratchet wheel, means operable to connect the reduction gearing with the disc, said last named means being releasable to permit adjustment of the actuating means carried by the disc a predetermined distance away from actuating position, a spring connected to the ratchet wheel and constantly urging the same to return to initial position, a detent operable to hold the ratchet wheel against retrograde movement, an arm journaled coaxially with the disc and adapted to be rocked in one direction by the trip member when the same is rocked about its pivot to disengage said detent, a slidable member operable, when the detent is tripped, to lock said arm in detent-disengaging position until the disc has returned to initial position, means carried by the disc adapted to release said slidable member when the disc has returned to initial position, said detent being formed so that in its return movement to operative position it rocks said arm in a direction opposite to its first described movement, and means carried by said arm operable on the last named movement to cause stoppage of the mechanism with which the control device is used.

GEORGE E. FORD.